UNITED STATES PATENT OFFICE.

JOHN W. MEADER, OF INDIANAPOLIS, INDIANA, ASSIGNOR TO THE ELI LILLY AND COMPANY, OF INDIANAPOLIS, INDIANA, A CORPORATION OF INDIANA.

CEPHAELIN PROPYL ETHER.

1,219,573.  Specification of Letters Patent.  Patented Mar. 20, 1917.

No Drawing.  Application filed July 17, 1915.  Serial No. 40,485.

*To all whom it may concern:*

Be it known that I, JOHN W. MEADER, a citizen of the United States, residing at Indianapolis, Marion county, and State of Indiana, have invented and discovered certain new and useful Improvements in Cephaelin Propyl Ether, of which the following is a specification.

The invention relates to the previously unknown cephaelin propyl ether, to which may be given the formula $C_{28}H_{37}O_3N_2OC_3H_7$, in which the hydrogen of the hydroxyl group of cephaelin has been replaced by a propyl group.

This compound is a valuable medicinal product, especially in the form of a salt. Its uses are similar to those of emetin and it may be administered in larger doses than that compound owing to its less toxicity.

The compound may be prepared by treating cephaelin with an alkali metal and a propyl haloid and isolating the cephaelin propyl ether by suitable methods. The process in detail may be carried out as follows:

46.6 grams of cephaelin and 4.6 grams of sodium are dissolved in about 400 cubic centimeters of absolute alcohol, about 16 grams of propyl bromid added, and the solution boiled under a reflux condenser for at least two hours. Cephaelin propyl ether which now exists in solution is isolated by recovering the alcohol, dissolving in dilute hydrochloric acid, making ammoniacal and extracting with ether. The ether solution of cephaelin propyl ether and unchanged cephaelin is extracted with an excess of dilute caustic soda solution to remove the cephaelin and evaporated to dryness on a water bath. The compound may be further purified by dissolving in an acid, crystallizing as a salt, dissolving in water, making ammoniacal, extracting with ether, recovering the ether and drying in vacuum.

In the above process potassium may be substituted for sodium and propyl iodid for propyl bromid. The absolute alcohol may be replaced by any other suitable solvent, for instance amyl alcohol.

Cephaelin propyl ether is a varnish like substance easily soluble in alcohol, ether, and chloroform. It dissolves in acids to form salts. The hydrobromid crystallizes in concentric groups of white needles. The hydrochlorid and nitrate are also crystalline.

What I claim is:

1. The propyl ether of cephaelin.
2. A propyl compound of cephaelin containing essentially the atomic aggroupment $C_{28}H_{37}O_3N_2OC_3H_7$.
3. The process of producing a propyl ether of cephaelin comprising adding to cephaelin an alkali metal, a propyl haloid and a solvent.
4. The process of producing cephaelin propyl ether by treating cephaelin with sodium ethylate and propyl bromid.
5. The process of producing a propyl ether of cephaelin which comprises treating cephaelin with an alkali metal alcoholate and a propyl haloid.

In witness whereof, I have hereunto set my hand and seal at Indianapolis, Indiana, this 15th day of July, A. D. nineteen hundred and fifteen.

JOHN W. MEADER. [L. S.]

Witnesses:
E. W. BRADFORD,
A. C. RICE.